US011714340B1

(12) United States Patent
Ibragimov et al.

(10) Patent No.: US 11,714,340 B1
(45) Date of Patent: Aug. 1, 2023

(54) CAMERA ASSEMBLY

(71) Applicants: Ali-Khan Ibragimov, Burbank, CA (US); Rashan Samad Allen, Burbank, CA (US)

(72) Inventors: Ali-Khan Ibragimov, Burbank, CA (US); Rashan Samad Allen, Burbank, CA (US)

( * ) Notice: Subject to any disclaimer, the term of this patent is extended or adjusted under 35 U.S.C. 154(b) by 0 days.

(21) Appl. No.: 17/561,000

(22) Filed: Dec. 23, 2021

Related U.S. Application Data

(60) Provisional application No. 63/209,805, filed on Jun. 11, 2021.

(51) Int. Cl.
*G03B 17/56* (2021.01)

(52) U.S. Cl.
CPC ......... *G03B 17/561* (2013.01); *G03B 17/566* (2013.01); *G03B 2217/002* (2013.01)

(58) Field of Classification Search
None
See application file for complete search history.

(56) References Cited

U.S. PATENT DOCUMENTS

| | | | |
|---|---|---|---|
| 2016/0344918 A1* | 11/2016 | Tao | H04N 5/2251 |
| 2017/0370522 A1* | 12/2017 | Schield | F16M 11/041 |
| 2018/0109765 A1* | 4/2018 | Wu | G03B 17/08 |
| 2019/0037166 A1* | 1/2019 | Davis | A45C 13/1092 |
| 2020/0245730 A1* | 8/2020 | Grinnell | A44B 17/0076 |

* cited by examiner

*Primary Examiner* — Rodney E Fuller
(74) *Attorney, Agent, or Firm* — Plager Schack LLP; Mark H. Plager; Michael J. O'Brien

(57) ABSTRACT

A camera assembly is configured to be worn on clothing. The camera assembly has a camera body further comprising at least one camera lens arranged against a front plate. At least one front plate magnet cavity and at least one front plate pin cavity are arranged on the front plate. At least one front plate magnet is arranged into the at least one front plate magnet cavity. At least one pin is arranged into the at least one front plate pin cavity. A rear body is configured to be arranged inside of the clothing. A rear plate is joined to the rear body. At least one rear plate magnet cavity and at least one rear plate pin cavity are arranged on the rear plate. The pin is inserted into the at least one rear plate pin cavity joining the camera body to the clothing.

4 Claims, 5 Drawing Sheets

CAMERA ASSEMBLY

RELATED APPLICATION

This application claims priority to provisional patent application U.S. Ser. No. 63/209,805 filed on Jun. 11, 2021, the entire contents of which is herein incorporated by reference.

BACKGROUND

The embodiments herein relate generally to camera technology.

Prior to the embodiments of the disclosed invention, there were no action cameras that seamlessly integrated directly into clothing, without clips or other additional accessories. Embodiments of the disclosed invention solve these problems

SUMMARY

A camera assembly is configured to be worn on clothing. The camera assembly has a camera body further comprising at least one camera lens arranged against a front plate. At least one front plate magnet cavity and at least one front plate pin cavity are arranged on the front plate. At least one front plate magnet is arranged into the at least one front plate magnet cavity. At least one pin is arranged into the at least one front plate pin cavity. A rear body is configured to be arranged inside of the clothing. A rear plate is joined to the rear body. At least one rear plate magnet cavity and at least one rear plate pin cavity are arranged on the rear plate. At least one rear plate magnet is arranged into the at least one rear plate magnet cavity and magnetically coupled to the at least one front plate magnet. The pin is inserted into the at least one rear plate pin cavity joining the camera body to the clothing.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
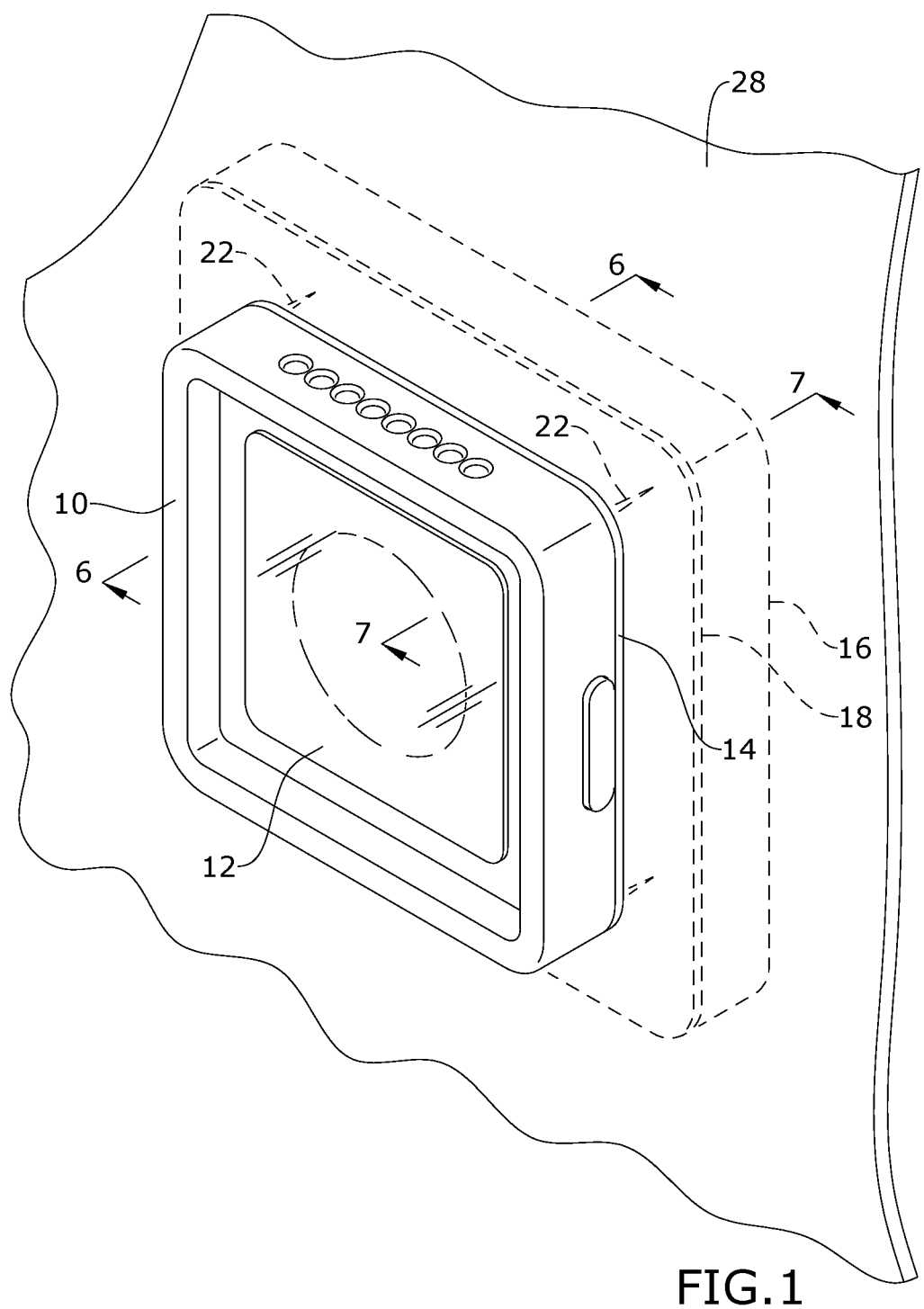
FIG. 1 shows a perspective view of one embodiment of the present invention shown in use.
Figure 2:
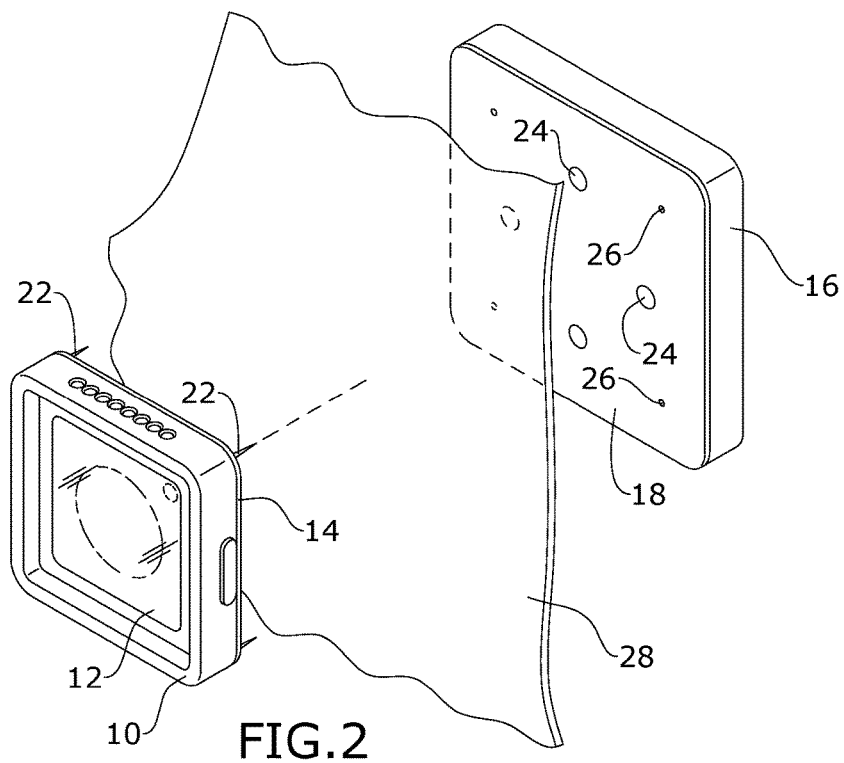
FIG. 2 shows a front exploded perspective view of one embodiment of the present invention.
Figure 3:
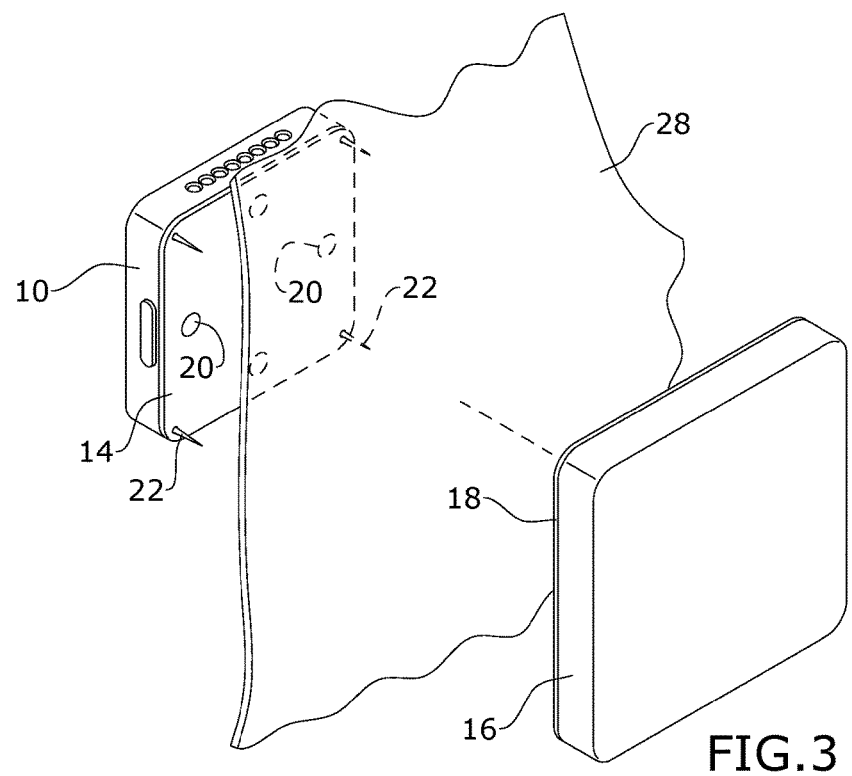
FIG. 3 shows a rear exploded perspective view of one embodiment of the present invention.
Figure 4:
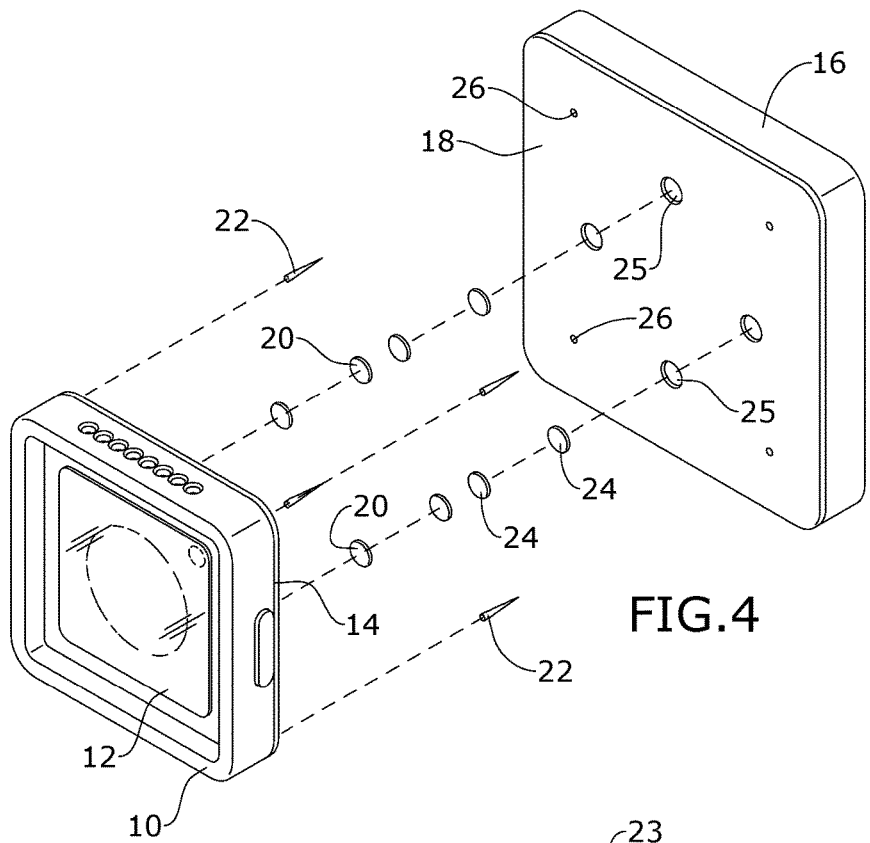
FIG. 4 shows a front exploded perspective view of one embodiment of the present invention.
Figure 5:
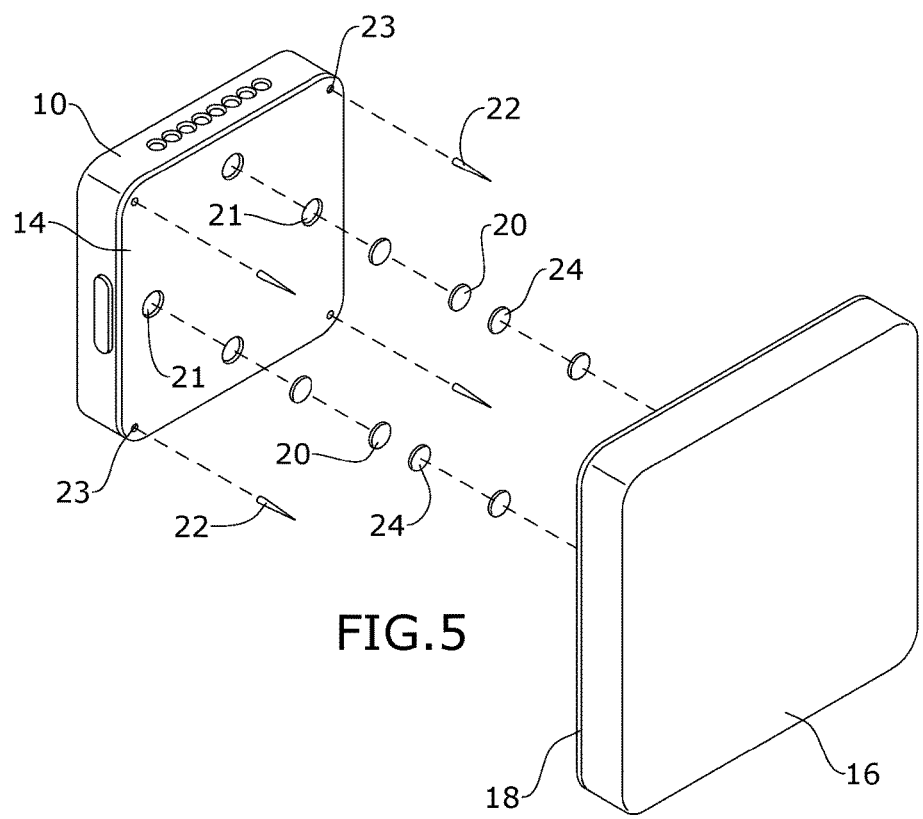
FIG. 5 shows a rear exploded perspective view of one embodiment of the present invention.
Figure 6:
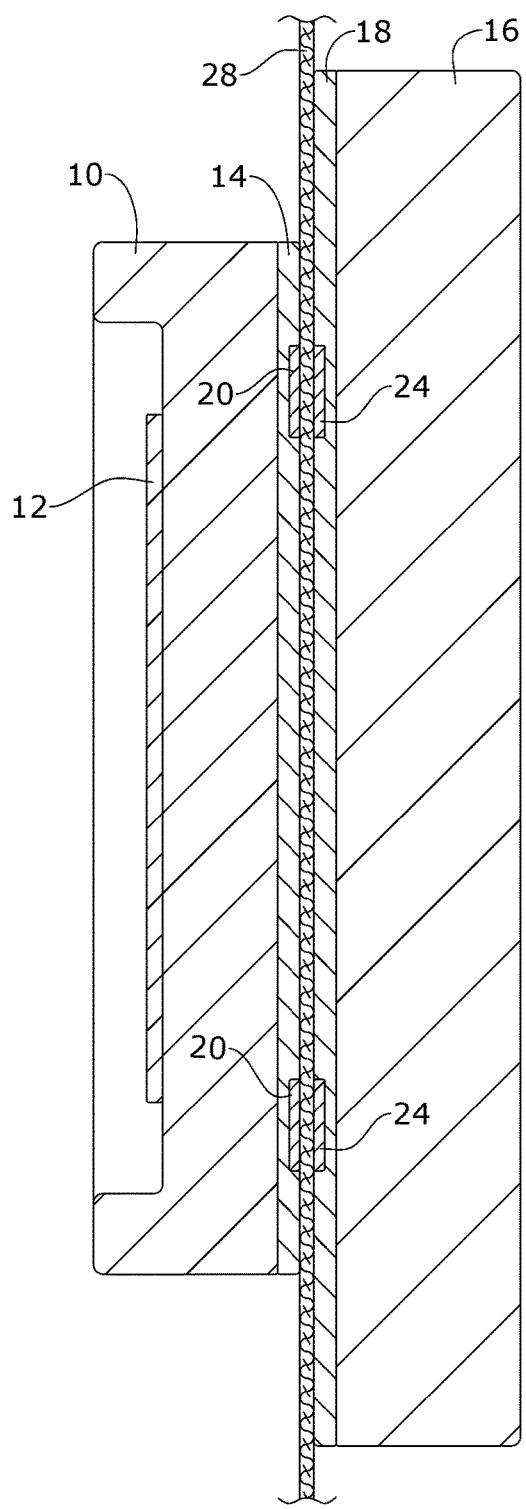
FIG. 6 shows a section view of one embodiment of the present invention taken along line 6-6 in FIG. 1.
Figure 7:
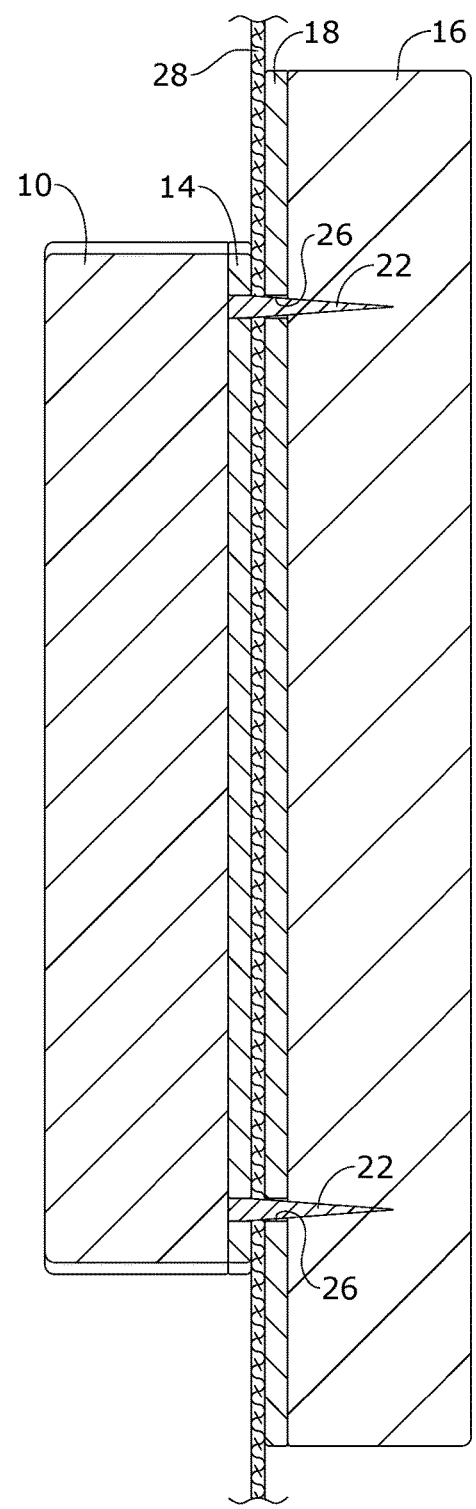
FIG. 7 shows a section view of one embodiment of the present invention taken along line 7-7 in FIG. 1.

By way of example, and referring to FIGS. 1-9, one embodiment of a camera assembly comprises a camera body 10 further comprising at least one camera lens 12 arranged against a front plate 14. At least one front plate magnet cavity 21 and at least one front plate pin cavity 23 are arranged on the front plate 14. At least one front plate magnet 20 is arranged into the at least one front plate magnet cavity 21. At least one pin 22 is arranged into the at least one front plate pin cavity 23. A rear body 16 is configured to be arranged inside of the clothing 28.

A rear plate 18 is joined to the rear body 16. At least one rear plate magnet cavity 25 and at least one rear plate pin cavity 26 are arranged on the rear plate 18. At least one rear plate magnet 24 is arranged into the at least one rear plate magnet cavity 25 and magnetically coupled to the at least one front plate magnet 20. The at least one pin 22 is inserted into the at least one rear plate pin cavity 26 joining the camera body 10 to the clothing 28.

In some embodiments, the at least one front plate magnet cavity 21 is four front plate magnet cavities and the at least one front plate magnet 20 is four front plate magnets. The at least one front plate pin cavity 23 can be four front plate pin cavities and at least one pin 22 can be four pins. All of the pins 22 can be arranged outside of all of the magnets 20, 24. In some embodiments, the at least one camera lens 12 can be at least two camera lenses such as two, three or four camera lenses.

Figure 8:
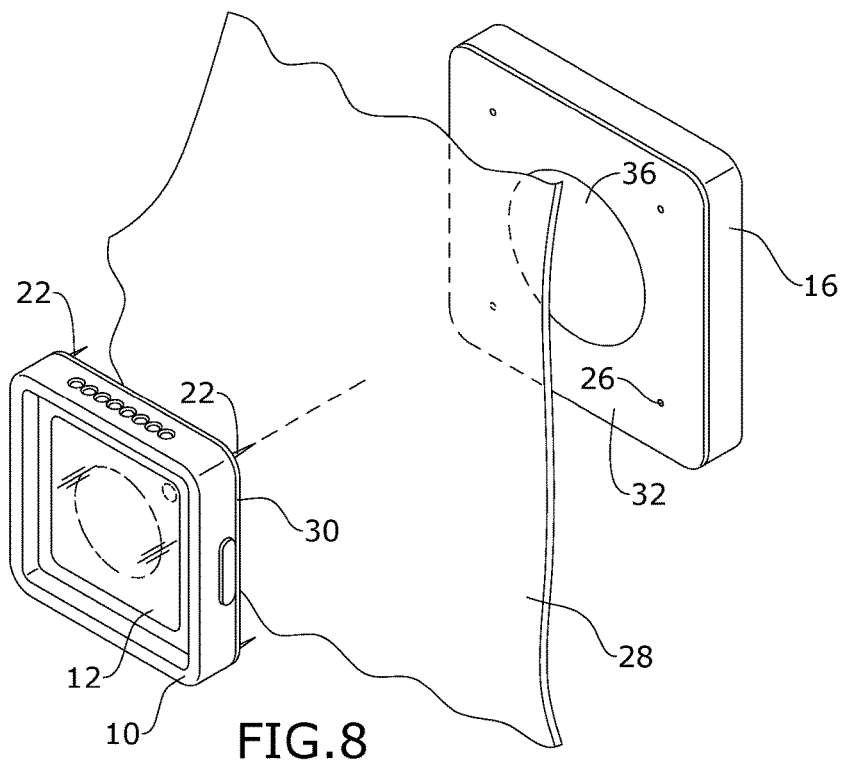
FIG. 8 shows a front exploded perspective view of one embodiment of the present invention.
Figure 9:
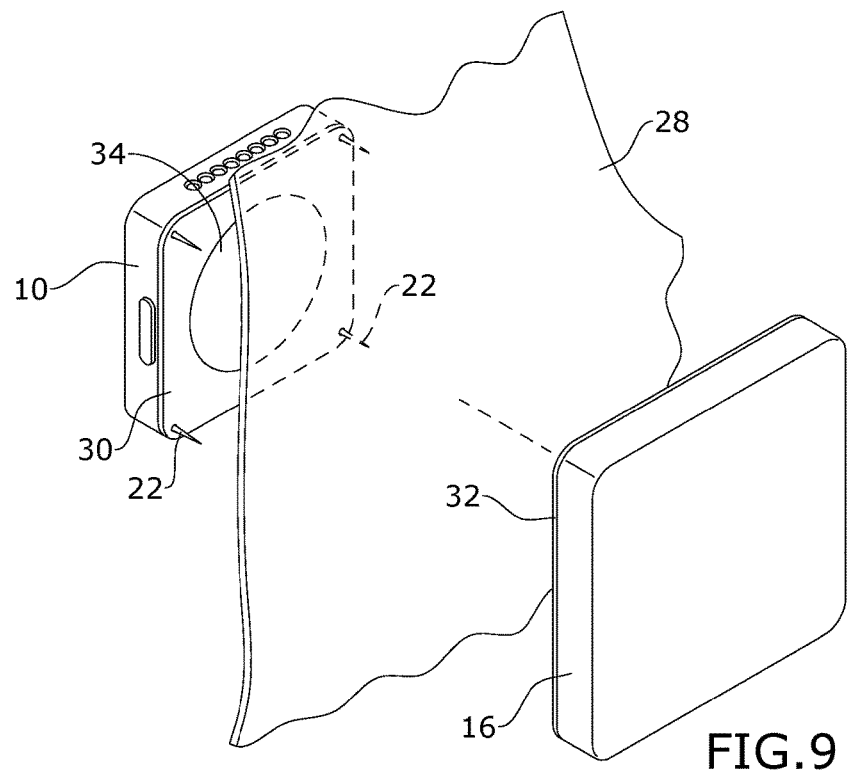
FIG. 9 shows a rear exploded perspective view of one embodiment of the present invention.

Turning to FIG. 8-9, the camera assembly of claim 1, the at least one front plate magnet cavity and the at least one front plate magnet 34 can provide wireless charging to the camera body 10. The at least one rear plate magnet 36 and the at least one front plate magnet 34 can be arranged to provide wireless charging to the camera body 10.

In some embodiments, the camera body can further comprise a microcontroller electrically coupled to a battery, a memory card, and a light detection and ranging (Lidar) scanner.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A camera assembly, configured to be worn on clothing; the camera assembly comprising:
    a camera body further comprising at least one camera lens arranged against a front plate
    at least one front plate magnet cavity and at least one front plate pin cavity, arranged on the front plate;
    at least one front plate magnet, arranged into the at least one front plate magnet cavity;
    at least one pin, arranged into the at least one front plate pin cavity;
    a rear body, configured to be arranged inside of the clothing;
    a rear plate, joined to the rear body;
    at least one rear plate magnet cavity and at least one rear plate pin cavity, arranged on the rear plate;
    at least one rear plate magnet, arranged into the at least one rear plate magnet cavity and magnetically coupled to the at least one front plate magnet;
    wherein the pin is inserted into the at least one rear plate pin cavity joining the camera body to the clothing.

2. The camera assembly of claim 1, wherein the at least one front plate magnet cavity is four front plate magnet cavities and the at least one front plate magnet is four front plate magnets.

3. The camera assembly of claim 2, wherein the at least one front plate pin cavity is four front plate pin cavities and at least one pin is four pins.

4. The camera assembly of claim 3, wherein all of the pins are arranged outside of all of the magnets.

\* \* \* \* \*